No. 886,371. PATENTED MAY 5, 1908.
A. S. HUBBARD.
SYSTEM OF ELECTRICAL DISTRIBUTION.
APPLICATION FILED AUG. 10, 1905.
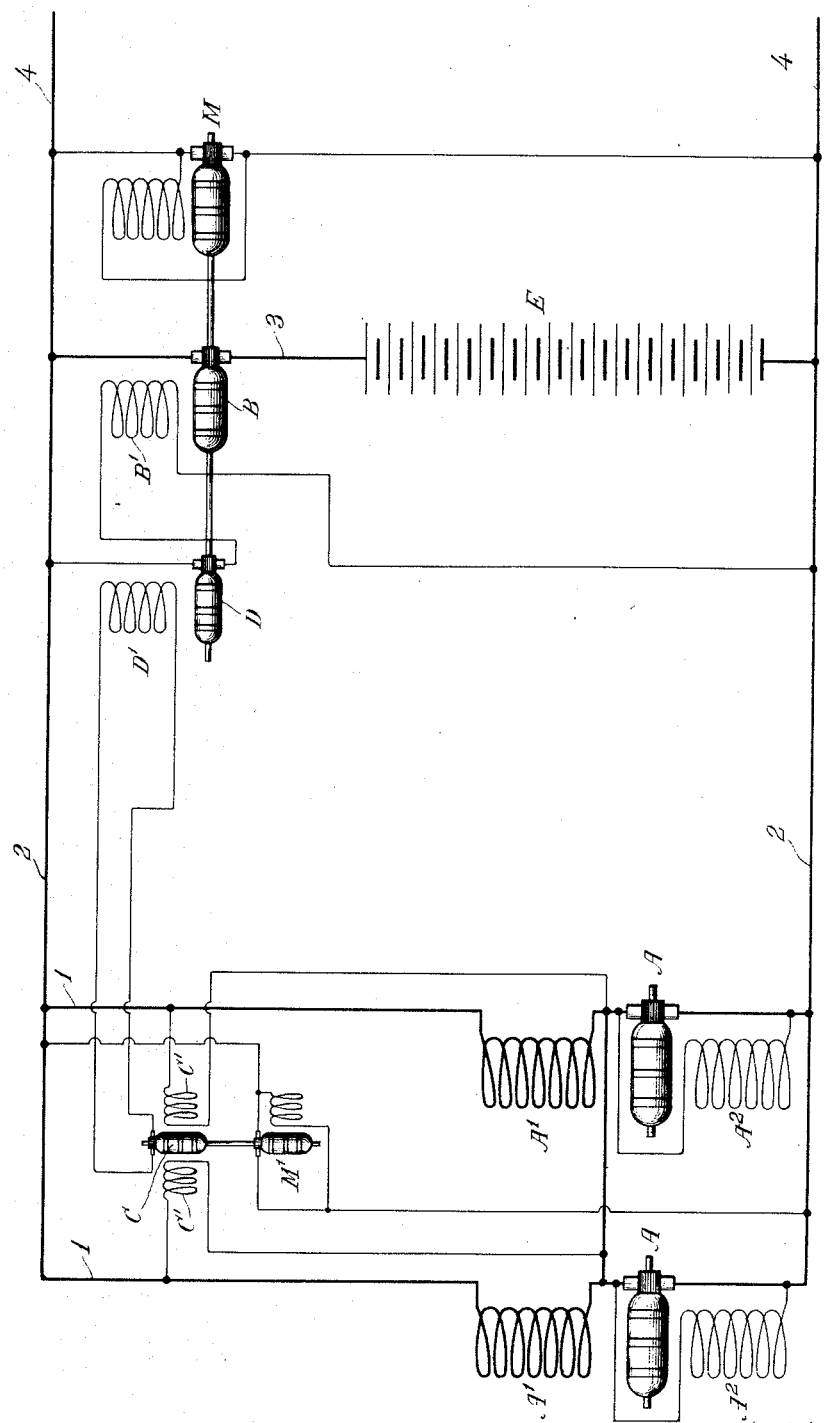

UNITED STATES PATENT OFFICE.

ALBERT S. HUBBARD, OF BELLEVILLE, NEW JERSEY, ASSIGNOR TO GOULD STORAGE BATTERY COMPANY, A CORPORATION OF NEW YORK.

SYSTEM OF ELECTRICAL DISTRIBUTION.

No. 886,371.   Specification of Letters Patent.   Patented May 5, 1908.

Application filed August 10, 1905. Serial No. 273,522.

*To all whom it may concern:*

Be it known that I, ALBERT S. HUBBARD, a citizen of the United States, and a resident of Belleville, Essex county, State of New Jersey, have invented certain new and useful Improvements in Systems of Electrical Distribution, of which the following is a specification.

My invention relates to systems of electrical distribution in which an auxiliary storage battery is connected in parallel to compound wound main generators in order that that battery may maintain a substantially constant load on the main generator.

My invention comprises a novel means for regulating the action of the battery.

I prefer to apply my invention to systems employing a booster in series with the battery so that the battery charge and discharge may be regulated by varying the booster voltage. By my invention I regulate the strength of the booster field and therefore the E. M. F. of the booster in accordance with variations in the difference of potential across the series fields of the compound wound main generators. This I do by connecting a regulating coil, preferably the field coil of an exciter, in shunt to the series field winding of the compound wound main generator, if there be only one, and I provide means whereby fluctuations of current in this regulating coil due to changes in the difference of potential across the series winding will regulate the booster voltage. If there be several compound wound generators I may, if equalizing connections be provided, connect the coil so that it is in shunt with all of the series windings, but I prefer to employ separate regulating coils one connected across each of the series windings, the regulation then being dependent upon the average of the changes in the different regulating coils.

In order to utilize the feeble currents that would necessarily be obtained from coils connected across the series field coils of the dynamo I have provided a special arrangement of apparatus whereby changes in these coils may indirectly affect the booster armature in such a way that the effect upon the booster itself is very largely magnified. This magnifying apparatus includes an extremely small exciter whose fields are controlled by the coils in shunt to the series fields of the main generators and which in turn excites another regulating dynamo, which, in the present instance, is a counter machine, being connected in series with the field winding of the booster in a circuit across the main circuit so that the voltage of the counter machine and the voltage of the main line act oppositely upon the booster field and therefore upon the booster field strength. This magnifying apparatus is of value wherever it is desirable that the booster shall be regulated by initial changes of very small amount.

The drawing accompanying this specification is a diagram disclosing one embodiment of my invention.

In this embodiment A A are the armatures of two main generators. A' A' are the series field coils for these generators and A² A² are the shunt field coils thereof.

1, 1 represent the two circuits of the individual generators, while 2, 2, represent the combined generator circuit.

E is the storage battery and B the booster armature, the two being connected in series in the circuit 3, which is connected in parallel to the generator circuit 2 with reference to the working circuit 4.

B' is the field coil of the booster, which is connected in series with the armature D of a counter electro-motive-force machine in a circuit across the conductors 2, 2. The direction and strength of the current in the field-winding B' (and consequently the direction and value of the E. M. F. generated by B) depend upon the relation between the potential difference across 2—2 and that across D.

M is a motor which is mechanically connected to the booster and drives it unless the system is so adjusted that at times the booster is generating an E. M. F. in opposition to that of the current flowing through it, in which case the booster would become a motor and the machine M would deliver current to the circuit 4. The armature D is driven through its mechanical connection with B and M when its E. M. F. is greater than the potential difference across 2—2, but is itself a driver when its E. M. F. becomes less than the potential difference across 2—2.

The potential difference across 2—2 is constant, or nearly so, so that the strength of the booster field and, therefore, the E. M. F. of the booster armature will be dependent upon the E. M. F. generated by D, being at its maximum in one direction when the E. M. F. of D is lowest and being at its maximum in the other direction when the E. M. F. of D is highest. The E. M. F. of D is directly proportional to the strength of the current in $D^1$ which represents the field winding of the counter machine. This field winding receives its current from the armature C of an exciter which is mechanically connected to a motor M' to run at substantially constant speed.

The strength of the current furnished by the exciter will depend upon the strength of its field winding. This consists of two field coils $C^1$. Each of these field coils is connected in shunt to one of the series field coils A' of the compound wound generators. The strength of the current in either of these coils is directly dependent upon the potential difference at its terminals and this in turn is directly dependent upon the strength of the current in the corresponding coil A'. It will be seen, therefore, that the booster armature will vary its E. M. F. from a maximum in one direction to a maximum in the other direction to vary the charge and discharge of the battery, in direct accordance with the variation of potential difference across coils A' between whatever limits the apparatus may be adjusted for. Very slight differences in the potential difference across these main series coils will be very much magnified in affecting the E. M. F. of the booster.

I have provided a separate motor M' to drive the armature C, because this armature may be made very small relatively to the armature D, while the latter is small relatively to the armature B. It will, therefore, be found convenient to place the machines C and $M^1$ close to the generators, or perhaps on a bracket on a switchboard, connecting them to the outfit D B M only by a single pair of light conductors.

In operation it is preferable to adjust the system so that for a given current in the main generators the voltage of the booster will be zero, and the boosters will float across the line neither charging nor discharging, and for a given percentage of increase in the generator current, causing a like increase in the drop of potential across the series coils A', the booster will reach its maximum voltage in one direction, while for a similar decrease of generator current the booster will reach its maximum voltage in the other direction causing the maximum charge of the batteries.

I do not desire to be limited to the particular arrangement of apparatus shown and described, since such apparatus might be varied considerably while still maintaining the regulation of the booster by coils acted upon by the varying drop of potential on the main generator coils A', and acting upon the booster through intermediate magnifying apparatus. I would particularly point out that while I prefer to connect the coils C' across the terminals of the coils A', thus utilizing the entire drop of potential of the latter coils, yet it is not essential that this entire drop of potential should be utilized.

Having thus described my invention, what I claim as new, and desire to protect by Letters Patent, is:

1. The combination of a plurality of compound-wound generators in parallel, a circuit in parallel therewith containing a battery and a booster armature in series with each other, and a plurality of regulating coils for said booster each connected in shunt to the series-windings of one of said generators.

2. The combination with a compound-wound main generator, a battery in parallel therewith, and a booster in series with the battery, of a field-winding for said booster, a dynamo in series with said field-winding, an exciter for said dynamo, and a regulating coil for said exciter connected across the series field coil of the main generator.

3. A compound-wound generator, a circuit in parallel therewith containing a battery and a booster armature in series therewith, a dynamo connected to the booster field, a field coil for said dynamo, an exciter for said field coil, means for opposing the action of said dynamo, and a regulating coil for the exciter connected across the series field-coil of the main generator.

4. A compound-wound generator, a circuit in parallel therewith containing a battery and a booster armature in series therewith, a dynamo connected to the booster field, a field coil for said dynamo, an exciter for said field coil, a regulating coil for the exciter connected across the series field-coil of the main generator, and means for opposing the regulating effect of said regulating coil upon the booster field.

5. A main generator, a circuit in parallel therewith containing a battery and a booster armature in series therewith, a dynamo connected to the booster field, a field coil for said dynamo, an exciter for said field coil, means for automatically regulating said exciter, a motor mechanically connected to the booster and to the dynamo connected to the booster field, and a separate motor mechanically connected to the exciter.

6. A compound-wound generator, a circuit in parallel therewith containing a battery and a booster armature in series therewith, a dynamo connected to the booster field, a field coil for said dynamo, an exciter for said field coil, a regulating coil for the exciter connected across the series coil of the main generator, a motor mechanically connected to the booster and to the dynamo connected to the booster field, and a separate motor mechanically connected to the exciter.

7. The combination of a main generator, auxiliary battery and a booster in series therewith, of a booster field exciting dynamo, an automatically regulated exciting dynamo therefor, a motor mechanically connected to the booster and the former exciting dynamo, and an independent motor connected to the latter exciting dynamo.

8. The combination with a main generator, a regulating battery and a booster in the battery circuit of a pair of regulating dynamos, one having a field winding connected to be influenced by changes of electrical condition of the system and its armature connected to the field winding of the other regulating dynamo to govern the current therein, while the latter dynamo is connected to the booster field winding to govern the current therein.

9. The combination with a main generator, a regulating battery and a booster in the battery circuit of a pair of regulating dynamos, one having a field winding connected to be influenced by changes of electrical condition of the system and its armature connected to the field winding of the other regulating dynamo to govern the current therein, while the latter dynamo is a counter electro-motive-force machine connected in series with the booster field winding in a branch circuit.

10. The combination with a main generator, a regulating battery and a booster in the battery circuit, of a pair of regulating dynamos, one having a field winding in the branch circuit of the main generator and its armature connected to the field winding of the other regulating dynamo to govern the current therein, while the latter dynamo is connected to the booster field winding to govern the current therein.

In testimony whereof, I have signed my name to this specification, in the presence of two subscribing witnesses.

ALBERT S. HUBBARD.

Witnesses:
RICHARD EYRE,
DE FOREST JETMORE.